L. SHAW.
AUTOMATIC DEVICE FOR OPERATING WATER SEALS FOR GAS MAINS.
APPLICATION FILED JUNE 24, 1908.

902,454.

Patented Oct. 27, 1908.

3 SHEETS—SHEET 1.

L. SHAW.
AUTOMATIC DEVICE FOR OPERATING WATER SEALS FOR GAS MAINS.
APPLICATION FILED JUNE 24, 1908.

902,454.

Patented Oct. 27, 1908.

3 SHEETS—SHEET 2.

WITNESSES

INVENTOR

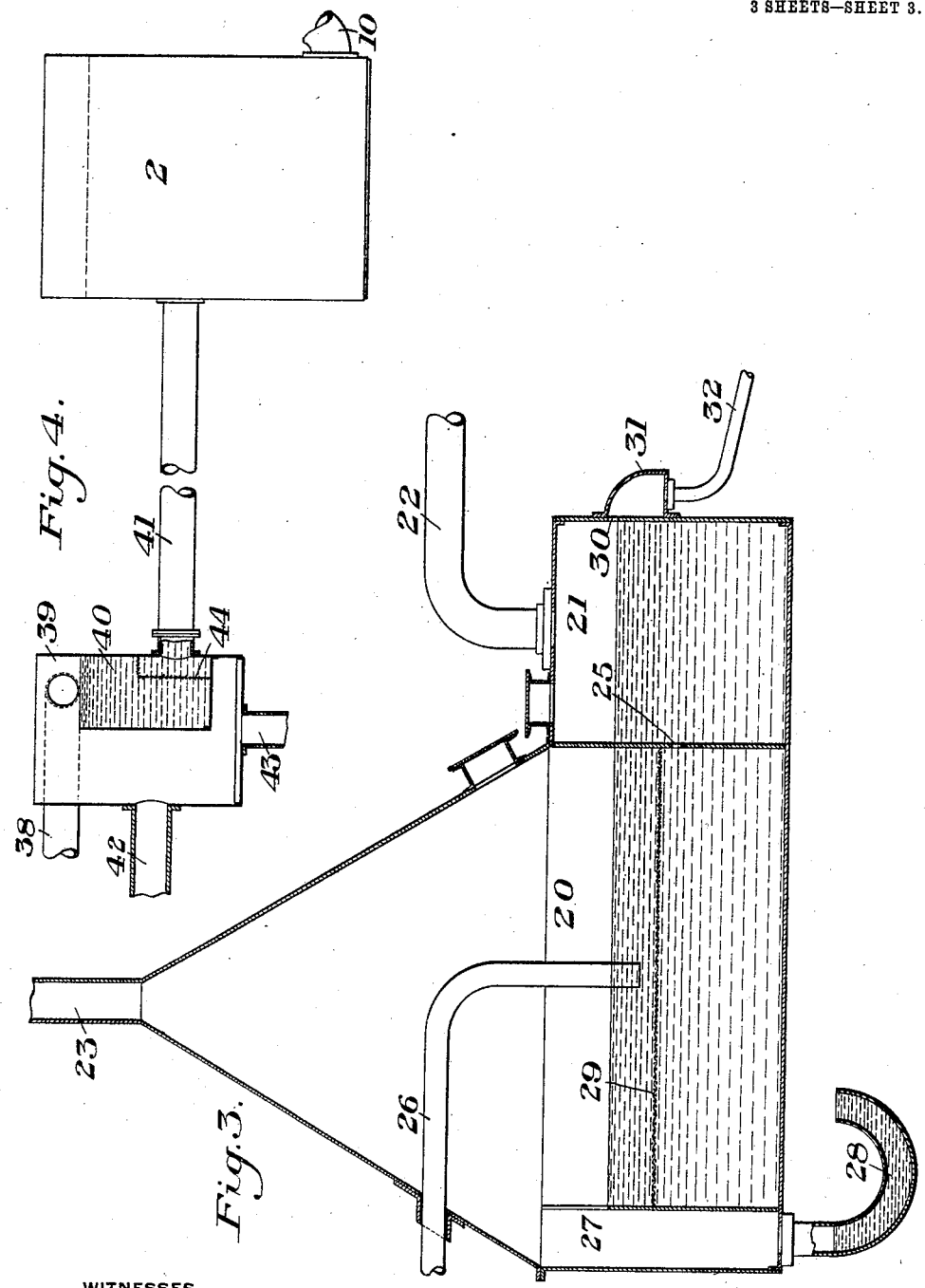

UNITED STATES PATENT OFFICE.

LEONARD SHAW, OF CHICAGO, ILLINOIS.

AUTOMATIC DEVICE FOR OPERATING WATER SEALS FOR GAS-MAINS.

No. 902,454.     Specification of Letters Patent.     Patented Oct. 27, 1908.

Application filed June 24, 1908. Serial No. 440,125.

*To all whom it may concern:*

Be it known that I, LEONARD SHAW, of Chicago, in the county of Cook and State of Illinois, have invented a new and useful Automatic Device for Operating Water-Seals for Gas-Mains, of which the following is a full, clear, and exact description, reference being had to the accompanying drawings, forming part of this specification, in which—

Figure 1:
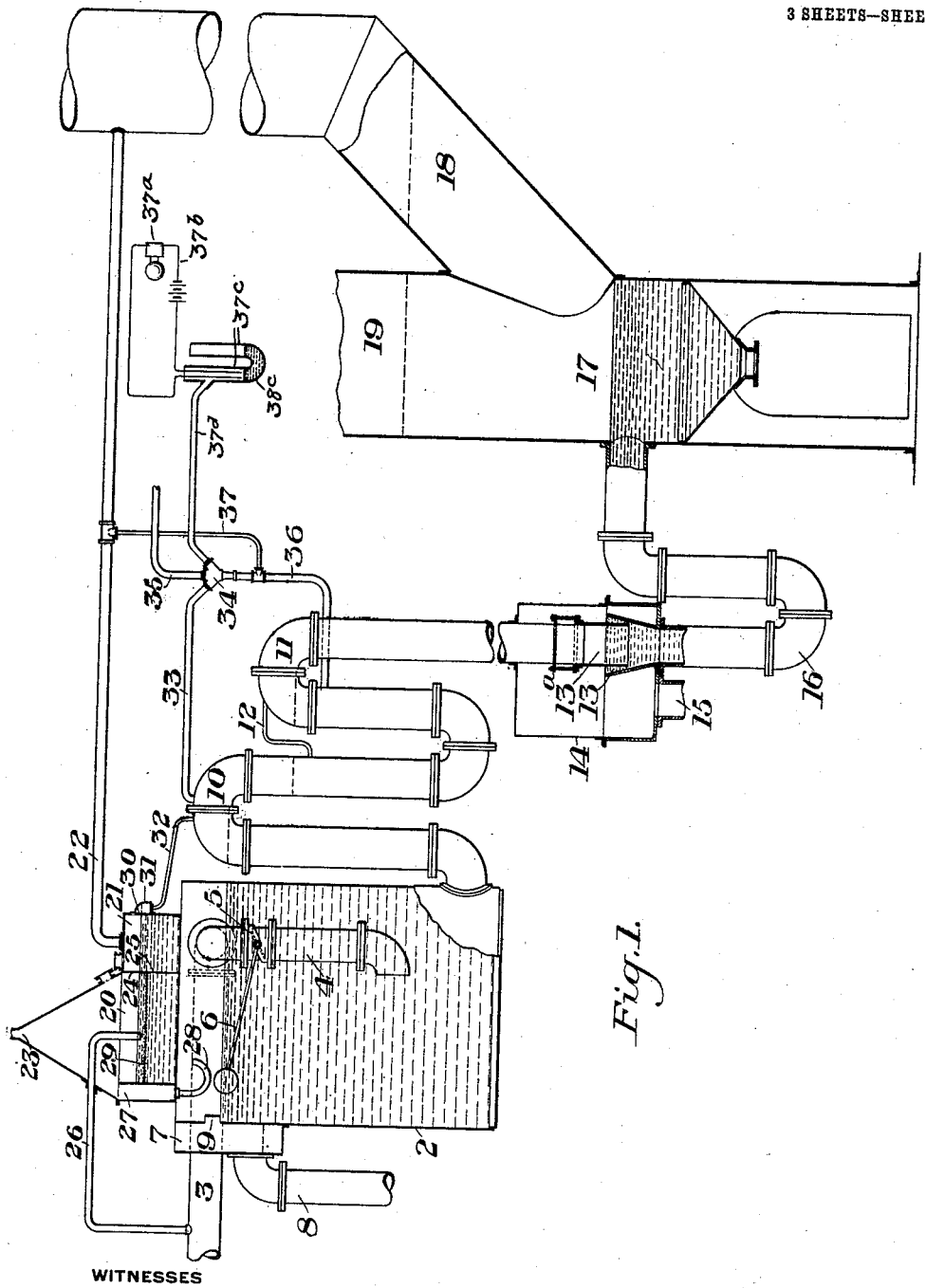
Figure 2:
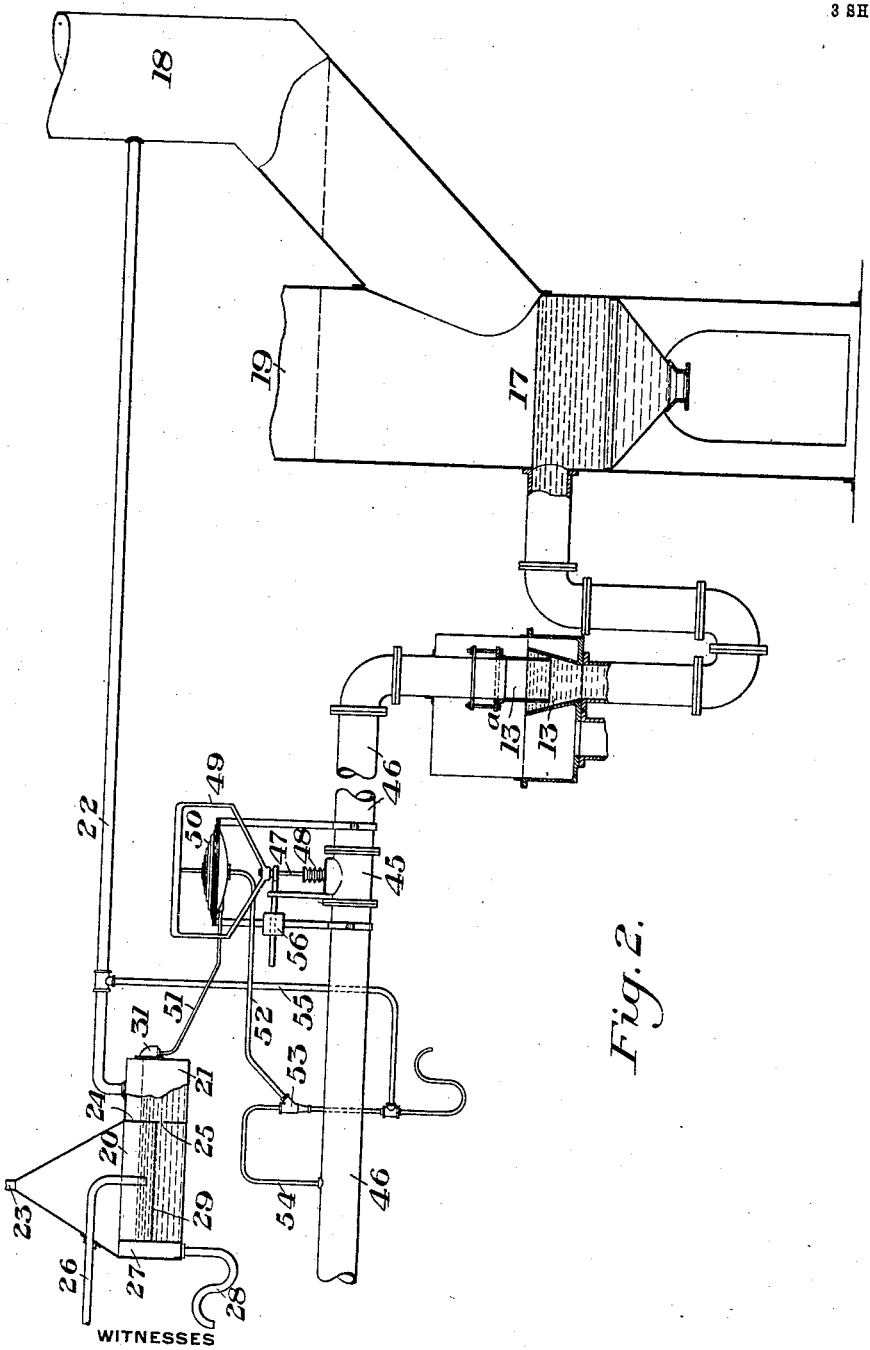

Figure 1 is a side elevation, partly in section, and largely diagrammatic, of one form of apparatus embodying my invention; Fig. 2 is a similar view showing a modification; Fig. 3 is a detail sectional view showing the relay tanks on a larger scale; and Fig. 4 is an elevation, partly in section, showing a modified arrangement of the water supply for the main tank.

My invention is primarily designed to provide means for automatically effecting a water-seal in the gas main of a gas-cleaning plant whenever the gas pressure in the plant falls below a predetermined minimum for the purpose of stopping the flow of gas and preventing the drawing of air into the plant by the gas washers, which would produce an explosive mixture in the plant and cause an explosion in the event of this mixture becoming ignited from any cause. The invention is, however, applicable to various purposes where the automatic control of the flow of gas can be obtained by variation of pressure in the system.

The precise nature of my invention will be best understood by reference to the accompanying drawings, which will now be described, it being premised, however, that the invention is susceptible of other embodiments and may be variously changed in its details of construction and arrangement within the scope of the appended claims.

Referring first to the form of my invention which is shown in Fig. 1, the numeral 2 designates a main supply tank for the purpose of carrying a constant volume of water. This tank is supplied by a feed-pipe 3, which has an arm 4 extending down within the tank and provided with a regulating valve 5 to the stem of which is connected a float lever 6. By means of this float lever the valve 5 is regulated to maintain a substantially constant level of water in the main tank 2. This tank is provided with an overflow box 7 having a discharge or waste pipe 8 leading therefrom, the overflow opening from the tank 2 into said box being indicated at 9. Attached to the lower portion of the tank 2 is a siphon, or double siphon, consisting preferably of two inverted U-shaped loops of pipe 10 and 11. The top of the first loop 10 is slightly below the top of the tank 2, while the top of the second loop is at a lower level. A vent pipe 12 connects the top of the second loop 11 with the down-leg of the first loop 10. The down-leg of the second loop is extended into an overflow funnel 13, and has an adjustable discharge section 13ª at its lower end which is telescopically movable thereon. The overflow funnel 13 is inclosed in an overflow and splash box 14, having a waste or discharge pipe 15. The discharge of the funnel 13 is connected by a water-sealing loop 16 with the water-sealing chamber 17 of the gas main.

18 designates the inlet branch of the gas main by which the gas enters the water-sealing chamber, and 19 is the discharge arm of said pipe leading from the water-sealing chamber.

20 and 21 designate two relay tanks, the tank 21 having a closed top and being connected by a gas pipe 22 with the gas main 18. The relay tank 20 is an open tank in that it is exposed to atmospheric pressure through the vent-opening 23. The two tanks are separated by a wall or partition 24 having therein a slot or opening 25.

26 is a supply pipe for the tank 20, and which may be conveniently connected to the main supply pipe 3. The tank 20 is provided with an overflow compartment 27 having a water-sealed waste pipe 28 which may discharge into the main supply tank 2. Placed in the open tank 20 above the level of the slot 25 which connects the two tanks is a screen 29, which will prevent the entrance of any foreign material which might clog up the slot 25 or which might pass through into the tank 21. The tank 21 has a weir edge 30 for the overflow of water, and to the outside of the tank around the slot formed by this weir edge is attached an overflow box 31. From the bottom of this overflow box 31 leads an automatic vent pipe 32, which is connected to the top of the first loop 10 of the main siphon. Connected to the top of the first loop 10 of the siphon is a jet or suction pipe 33, which leads to a jet siphon 34 having a water-supply pipe 35, and also having a pipe connection 36 with the up-leg of the second loop 11 of the main siphon.

37 is a gas discharge pipe leading from the connection 36 to the gas pipe 22.

The operation is as follows:—The jet siphon 34 is drawing gas from the upper space of the main siphon continuously, but is unable to exhaust this space and start the flow in the main siphon so long as the automatic vent pipe 32 is admitting gas from the closed tank 21. The vent pipe 32 will continue to admit gas into the upper space of the main siphon so long as the pressure in the gas main 18 is sufficient to keep the level of water in the closed tank 21 below the overflow edge 30. As soon, however, as the pressure of the gas in the main 18 is sufficiently reduced, the flow of water from the tank 20 through the slot 25 into the tank 21, which takes place under this reduction of pressure, will cause the water in the tank 21 to rise above the level of the overflow edge 30 and thus fill the automatic vent pipe 32 with water. As soon as this pipe is closed with water, the jet siphon will exhaust the upper space of the main siphon, and this siphon will at once commence to act and will continue to act until the pressure in the gas main 18 is again increased sufficiently to depress the level of water in the tank 21 below the overflow edge 30. The pressure, with respect to atmospheric pressure, at which the water will rise above the overflow edge 30 in the tank 21 is determined by the elevation of the overflow 27 of the open tank 20 with respect to the elevation of the overflow edge 30 of the tank 21. The water discharged from the tank 2 by the action of the main siphon flows into the funnel 13 at considerable velocity, this velocity being sufficient to maintain the proper head of water in the water-seal 17 as shown by dotted lines. As soon, however, as the flow of water from the main siphon stops, the water from this gas seal 17 backs through the seal 16 into the funnel 13 and overflow box 14 and is discharged at the waste pipe 15. By adjusting the position of the discharge section 13ª of the siphon, the desired sealing level in the water-seal 17 may be obtained for any velocity of water at the overflow funnel sufficient to maintain the level.

The float-operated valve in the main supply tank controls the level of the supply water in said tank, and tends to maintain a sufficient amount of water in the tank to maintain the sealing level in the seal 17 during the time the main siphon is in action. The object of the second loop of the main siphon is to diminish the space to be exhausted by the jet siphon, and may be omitted in some cases. One or more of these jet siphons or other suitable source of partial vacuum may be employed for the purpose of exhausting the upper space of the main siphon. The vent 12 between the two loops of the main siphon prevents the pulling of the water from the lower loop when the supply is cut off after an operation by the admission of gas to the top of the second loop.

37ª designates an electric bell, or other signal, whose circuit 37ᵇ is arranged to be closed by a mercury contact 37ᶜ, when the device is operated. A pipe 37ᵈ leading from the jet siphon 34 to the U-tube 38ᵉ which contains the mercury controls the level of the mercury.

While I have shown the main supply tank 2 as being an open tank, it is obvious that it may be closed and subject to pressure of the gas in the gas cleaning plant. In this case the overflow pipe 8 would be provided with a water seal.

Fig. 4 shows a modified arrangement of the water supply, in which the main water supply pipe 38 leads into a tank or reservoir 39 having therein a distributing box or compartment 40, which is connected by a pipe 41 with the main supply tank 2. The pipe 38 is arranged to discharge directly into the open top of the distributing box compartment 40. The tank 39 has an overflow pipe 42, and also a pipe connection 43 leading from its lower portion to the cleaning plant pumps, and forming the supply for such pumps. The entrance to the pipe connection 41 is guarded by a screen 44. In this modified arrangement of the water supply, so long as the main siphon is not in action the water discharged by the pipe 38 will overflow from the compartment 40 into the tank 39, and will pass directly into the pump supply pipe 43. In case of any stoppage, the water will escape by the waste pipe 42. As soon, however, as the main siphon commences to act, the water discharged by the supply pipe 38 will flow directly from the compartment 40 to the main supply tank 2 through the connection 41, and thence to the siphon.

In the modification shown in Fig. 2, the main siphon is omitted, and instead thereof I provide a diaphragm operated valve 45, which controls the flow of water through a main supply pipe 46, which leads directly into the overflow funnel 13, which is the same as the overflow funnel first described. The stem 47 of the valve 45 is connected with the valve through a flexible stuffing box 48 of the accordion type. This stuffing box is secured to the bonnet of the valve 45 at one end and to the stem 47 at the opposite end, the box being made up of a number of annular rings of sheet metal secured together, making a flexible box similar to the bellows of an accordion. Secured to the stem 47 is a yoke 49 in which is suspended a hollow collapsible diaphragm 50. The interior of this diaphragm is connected by a pipe 51 with the overflow box 31 of the closed relay tank 21 (the arrangement of the relay tanks being the same as in Fig. 1, and the same parts having the same reference numerals as in that figure). The interior of the diaphragm valve 50 is also connected by a pipe 52 with a jet siphon or other suitable source of partial vacuum 53, which may receive its water supply by pipe connection 54 with the main supply pipe 46, and which has a gas discharge connection 55 with the gas pipe 22 which connects the tank 21 with the gas main 18.

The description heretofore given for the arrangement shown in Fig. 1 will apply to the arrangement shown in Fig. 2, with the exception that the water jet siphon 53 instead of exhausting the upper space of the main siphon, exhausts the space within the hollow diaphragm and causes said diaphragm to collapse due to the greater pressure on its exterior when the vent pipe 51 is closed by water. The motion of the diaphragm is transmitted to the valve 45, which is preferably a balanced valve, thereby controlling the supply of water to the overflow funnel 12. The flexible stuffing box 48 prevents any friction on the stem of the valve, and tends to lift the flexible diaphragm and close the balanced valve as soon as the automatic vent pipe 51 is opened. A counterweighted lever 56 may be provided to assist in closing the valve 45.

My invention provides a simple and effective means by which a variation in the pressure may be utilized to automatically control the flow of gas. While in the system shown the arrangement operates upon a diminution of pressure in the gas main, it is obvious that it may be made to operate to equal advantage upon a predetermined maximum of pressure. In such cases the overflows 27 and 30 of the relay tanks are simply reversed relatively to each other, the vent pipe 32 being connected to the overflow box 27 instead of to the overflow box 31. It will also be obvious that the device may be made to operate in various ways by utilizing differences of pressure in the two relay tanks. My invention is also capable of various other modifications. Thus, the arrangement of the several tanks, the form of the siphon, and the manner of connecting the parts, which, as shown, is largely diagrammatic, may be varied in each case according to the particular conditions and requirements.

I claim:—

1. In apparatus of the character described, a gas conduit or main having a valve-seating compartment, a valve supply therefor, siphon devices for controlling the valve supply, and means controlled by variations of the gas pressure for controlling the action of the siphon devices, substantially as described.

2. In apparatus of the character described, a gas conduit or main having a water-sealing compartment, a water-supply therefor, means for controlling the flow of water through said supply dependent upon variations of pressure in the system, and means whereby the water will be automatically discharged from the sealing compartment when the supply thereto is cut off; substantially as described.

3. In apparatus of the character described, a gas conduit or main having a water-sealing compartment, a water-inlet therefor terminating in an open-overflow funnel, a water-supply pipe extending into said funnel, and means for controlling the flow of water in said pipe dependent on variations in the gas pressure; substantially as described.

4. In apparatus of the character described, a gas conduit or main having a water-sealing compartment, a water-inlet therefor terminating in an open-overflow portion, a water-supply pipe discharging into said portion, and means for controlling the flow of water in said pipe dependent on variations in the gas pressure; substantially as described.

5. In apparatus of the character described, a gas conduit or main having a water-sealing compartment, a water-inlet therefor terminating in an open-overflow funnel, a water-supply pipe discharging into said funnel, and means for controlling the flow of water in said pipe dependent on variations in the gas pressure, said pipe having a vertically adjustable discharge portion; substantially as described.

6. In apparatus of the character described, a gas conduit or main having a water-sealing compartment, a water-supply connection therefor, two connected relay tanks or reservoirs, means whereby variations in the pressure of gas in the system will cause a difference of level in the two relay tanks or reservoirs, and means operated by changes in the relative water levels of the two tanks or reservoirs for controlling the flow of water from the water-supply into the water-sealing compartment; substantially as described.

7. In apparatus of the character described, a gas conduit or main having a water-sealing compartment, a water-supply therefor, two connected relay tanks or reservoirs, one of said tanks or reservoirs being connected with the inlet portion of the gas main or conduit and the other of said reservoirs having a different pressure therein, and means controlled by variations of pressure in the two tanks or reservoirs for controlling the flow of water in said compartment; substantially as described.

8. In apparatus of the character described, a gas conduit or main having a water-sealing compartment, a water-supply therefor, two connected relay tanks or reservoirs, one of said tanks or reservoirs being connected with the inlet portion of the gas main or conduit, and the other of said reservoirs having a different pressure therein, and means controlled by variations of pressure in the two tanks or reservoirs for controlling the flow of water in said compartment, together with means whereby the water in said compartment will be automatically discharged therefrom when the supply thereto ceases; substantially as described.

9. In apparatus of the character described, a water-sealing compartment, means for supplying water thereto, two communicating relay tanks or reservoirs each having an overflow opening, one of said tanks or reservoirs being closed and connected with the system controlled by the water-seal, and the other of said tanks or reservoirs having a different pressure therein, means for supplying water to said reservoirs, and a siphon device controlled by variations in pressure in the two tanks or reservoirs and controlling the supply of water to the water-seal; substantially as described.

10. In apparatus of the character described, a gas main or conduit having a water-sealing compartment, water-supply connections therefor, a main supply tank, a siphon connection between said tank and the water inlet for the sealing compartment, and means operated by variations of pressure in the gas main for controlling the action of the siphon connection; substantially as described.

11. In apparatus of the character described, a gas main or conduit having a water-sealing compartment, a main water-supply tank or reservoir, a siphon device between the main tank or reservoir and the water-sealing compartment, relay tanks or reservoirs, and means controlled by differences of pressure in the gas system whereby the relay tanks or reservoirs control the action of the siphon device; substantially as described.

12. In apparatus of the character described, a main supply tank, a supply connection leading therefrom and including a siphon, and relay tanks controlled by differences of pressure in the gas system controlled by the apparatus for exhausting the siphon and controlling its operation; substantially as described.

13. In apparatus of the character described, a main supply tank, a supply connection leading therefrom and including a siphon, and relay tanks controlled by differences of pressure in the gas system controlled by the apparatus for exhausting the siphon and controlling its operation, together with means for maintaining a substantially constant supply of water in the main supply tank; substantially as described.

14. In apparatus of the character described, a main supply tank, a siphoned discharge connection for said tank, consisting of a looped pipe or conduit, means for exhausting the main siphon, and means controlled by differences of pressure in the gas system in which the apparatus is used for controlling the action of the secondary siphon; substantially as described.

15. In apparatus of the character described, a main supply tank or reservoir, having a siphoned discharge consisting of a looped pipe, a secondary siphon arranged to exhaust the main siphon, two relay tanks or reservoirs at least one of which is connected with the gas system controlled by the apparatus, and means operated by variations in the relative levels of the water in the two relay tanks or reservoirs and controlled by variations of pressure in the system for controlling the action of the secondary siphon and thereby of the main siphon; substantially as described.

16. In apparatus of the character described, a main supply tank having a siphoned discharge pipe, consisting of an inverted U-shaped loop whose upper portion is above the water level in the main supply tank or reservoir, a secondary siphon connected to the upper portion of the main siphon, a vent pipe also connected to the upper portion of the main siphon, a connection between said vent pipe and the gas system controlled by the apparatus, and a body of water controlled by variations of pressure in said system for controlling the connection between the vent pipe and the system; substantially as described.

17. In apparatus of the character described, a pressure system having a water-sealing compartment, a main water supply tank or reservoir, a pipe for conveying water from the main tank or reservoir to the water-sealing compartment, said pipe having therein two siphon bends at different levels, a siphoned jet for exhausting the upper space of the higher bend, and means controlled by variations of pressure in the system for controlling the action of the jet siphon; substantially as described.

18. In apparatus of the character described, a pressure system having the combination with a main supply tank or reservoir having an outlet pipe provided with a siphon, a device for exhausting the upper space of the siphon, and means for controlling the action of said device consisting of two communicating tanks or reservoirs one of which is connected with the gas system controlled by the apparatus and also with the upper space of the siphon; substantially as described.

19. In apparatus of the character described, a gas conduit or main having a water-sealing compartment, an inlet pipe therefor having a water-sealing bend and terminating in an open-top funnel, an overflow box surrounding said funnel, a supply pipe arranged to discharge into the funnel, and means controlled by variations of pressure in the gas main or conduit for controlling the flow of water in the supply pipe; substantially as described.

20. In apparatus of the character described, the combination with a gas system having a valve-seating compartment, of a main supply tank therefor, a secondary tank having a box or compartment therein arranged to overflow into the secondary tank, a supply pipe arranged to discharge into the box or compartment, and a pipe leading from the secondary tank to a point of water consumption; substantially as described.

21. In apparatus of the character described, a gas conduit or main having a valve-seating compartment, a water outlet therefor terminating in an overflow portion, a water supply pipe arranged to discharge into said overflow portion, and means for controlling the flow of water in said pipe dependent on variations in the gas pressure, substantially as described.

In testimony whereof, I have hereunto set my hand.

LEONARD SHAW.

Witnesses:
A. J. MOHR,
W. J. MELVIN.